(12) United States Patent  
Bui

(10) Patent No.: US 8,130,733 B2  
(45) Date of Patent: Mar. 6, 2012

(54) PROVIDING AD-HOC INTEROPERABILITY AMONG NETWORK NODES

(75) Inventor: Thomas T. Bui, Irvine, CA (US)

(73) Assignee: The Boeing Company, Chicago, IL (US)

( * ) Notice: Subject to any disclaimer, the term of this patent is extended or adjusted under 35 U.S.C. 154(b) by 530 days.

(21) Appl. No.: 11/589,341

(22) Filed: Oct. 30, 2006

(65) Prior Publication Data

US 2008/0101252 A1     May 1, 2008

(51) Int. Cl.  
*H04W 4/00* (2009.01)

(52) U.S. Cl. ................................ 370/338; 370/328

(58) Field of Classification Search .............. 370/328, 370/338, 260, 310, 343, 349, 453; 455/418–420, 455/423–425; 709/217, 221, 224  
See application file for complete search history.

(56) References Cited

U.S. PATENT DOCUMENTS

| | | | |
|---|---|---|---|
| 6,047,059 A * | 4/2000 | Lin et al. | 379/230 |
| 7,346,027 B2 * | 3/2008 | Bossoli et al. | 370/328 |
| 2003/0235175 A1 * | 12/2003 | Naghian et al. | 370/338 |
| 2004/0024896 A1 * | 2/2004 | Stafford et al. | 709/230 |
| 2004/0174822 A1 * | 9/2004 | Bui | 370/252 |
| 2005/0153725 A1 * | 7/2005 | Naghian et al. | 455/520 |
| 2006/0002372 A1 * | 1/2006 | Smith | 370/352 |
| 2006/0203722 A1 * | 9/2006 | Oommen | 370/229 |
| 2006/0227801 A1 * | 10/2006 | Nanda et al. | 370/447 |
| 2006/0251258 A1 * | 11/2006 | Lillie et al. | 380/270 |
| 2006/0291434 A1 * | 12/2006 | Gu et al. | 370/338 |
| 2007/0011335 A1 * | 1/2007 | Burns et al. | 709/227 |
| 2007/0021115 A1 * | 1/2007 | Nikkelen | 455/428 |
| 2007/0032269 A1 * | 2/2007 | Shostak | 455/563 |
| 2007/0036092 A1 * | 2/2007 | Pang | 370/256 |
| 2007/0036118 A1 * | 2/2007 | Shaffer et al. | 370/338 |
| 2007/0037596 A1 * | 2/2007 | Shaffer et al. | 455/518 |
| 2007/0067589 A1 * | 3/2007 | Mishra et al. | 711/163 |
| 2007/0076094 A1 * | 4/2007 | Dickerson et al. | 348/143 |
| 2008/0033785 A1 * | 2/2008 | Anke | 705/10 |
| 2008/0123586 A1 * | 5/2008 | Manser | 370/328 |

* cited by examiner

*Primary Examiner* — George Eng  
*Assistant Examiner* — Michael Faragalla  
(74) *Attorney, Agent, or Firm* — Harness, Dickey & Pierce, P.L.C.

(57) ABSTRACT

A method of providing interoperability among communications network nodes. Interoperability types, including a basic type of interoperability, are defined. For each interoperability type, a support capability is defined for implementation on a node without modification to the node application layer. On each node is provided at least the basic interoperability type support capability. Each node can use the basic interoperability type support capability to obtain, on an ad-hoc basis, a support capability for another type of interoperability with another node. This method facilitates system-of-systems interoperability while lowering complexity and risk.

19 Claims, 4 Drawing Sheets

PROVIDING AD-HOC INTEROPERABILITY AMONG NETWORK NODES

FIELD

The present disclosure relates generally to communication networks and, more particularly, to providing interoperability on an ad-hoc basis among a plurality of network nodes.

BACKGROUND

The statements in this section merely provide background information related to the present disclosure and may not constitute prior art.

In net-centric operations (NCO) environments, it can be highly desirable for net-centric systems to be able to collaborate in unexpected ways with many other systems. For example, nodes in a military net-centric environment could include radio systems, communications systems on airplanes, satellites and/or ground vehicles, and/or other systems whose roles might not be strictly communications. Such systems typically need to be able to collaborate and communicate with one another. Traditional one-to-one interoperability between systems (also known as stovepipe interoperability) is poorly suited to such an environment. For example, it can be costly and time consuming to provide a system that meets stovepipe interoperability requirements. Further, in the NCO environment, collaboration between systems typically is determined dynamically at mission time. This lack of a priori knowledge of what may be needed for interoperability makes the current approach to developing interoperability requirements impracticable.

SUMMARY

The present disclosure, in one implementation, is directed to a method of providing interoperability among a plurality of nodes in a communications network. A plurality of types of interoperability, including a basic type of interoperability, are defined. For each interoperability type, a support capability is defined for implementation on a node without modification to an application layer of the node. On each of the nodes is provided at least the support capability for the basic type of interoperability. Each node is enabled to use the support capability for the basic type of interoperability to obtain, on an ad-hoc basis, a support capability for another type of interoperability with another of the nodes.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION OF THE PREFERRED EMBODIMENTS

The following description is merely exemplary in nature and is not intended to limit the present disclosure, application, or uses. Although various implementations of the present disclosure are discussed with reference to mobile ad-hoc networks and network-centric operations (NCO) in a military environment, the disclosure is not so limited. The disclosure may be implemented relative to many different types of networks and/or enterprises and relative to many different types of nodes, e.g., non-mobile and/or nodes established on other than an ad-hoc basis.

In various implementations of the disclosure, methods and systems are provided which may be used to allow virtually any system or platform in a communications network to exchange information with virtually any other system or platform on the network. In some implementations, a framework is provided in which types of interoperability capability, including a basic type of capability, are defined. In various implementations, all systems in the network are provided with the basic type of capability. Using this common basic capability type as further described below, systems with diverse functions and capabilities can interoperate, e.g., at least at a basic level of proficiency.

Figure 1:
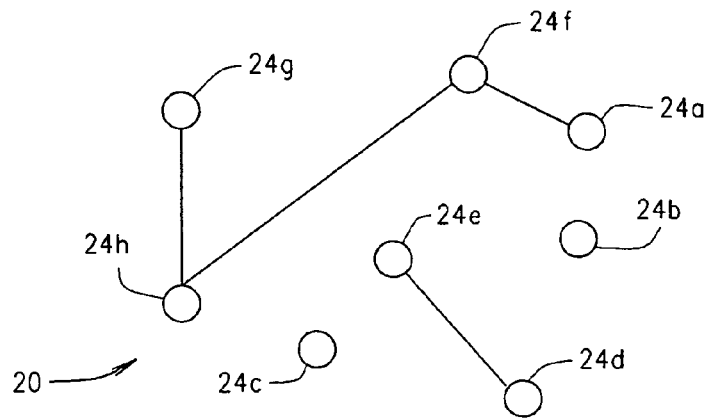
FIG. 1 is a diagram of a communications network including a plurality of nodes in accordance with one implementation of the disclosure.

A communications network configured in accordance with one implementation of the disclosure is indicated generally in FIG. 1 by reference number 20. The network 20 includes a plurality of nodes 24a-24h, some or all of which may be mobile ad-hoc nodes. In some implementations, the network 20 may be a system of systems, and accordingly a node 24 may be a system. In the present exemplary implementation, the network 20 is a net-centric environment including a plurality of systems and platforms. Unless otherwise indicated, the terms "node", "system" and "platform" may be used interchangeably in this disclosure to refer to network entities which, although typically physically (e.g., spatially) separate from one another, can have and/or acquire a capability for communication with one another as further described below. In the present exemplary implementation, the nodes 24 are included in a military environment and may be disparate from one another in complexity and functioning.

As shown in FIG. 1, the nodes 24 are in various states of acquiring, having, and/or not having various capabilities for communication with one another. Each node 24 has an interoperability support capability for a basic type of interoperability. Additionally, some or all of the nodes 24 may have, or may be acquiring, a support capability for a different type of interoperability as further described below.

Figure 2:
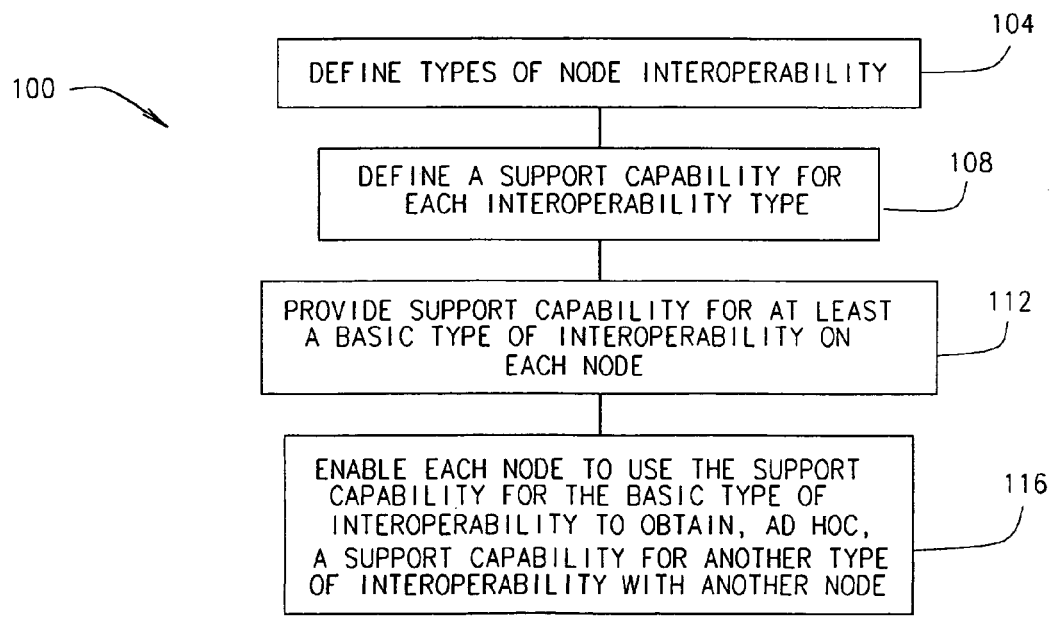
FIG. 2 is a flow diagram of a method of providing interoperability among network nodes in accordance with one implementation of the disclosure.

A flow diagram of one implementation of a method of providing interoperability among nodes in a network is indicated generally in FIG. 2 by reference number 100. In step 104, a plurality of types of node interoperability, including a basic type of interoperability, are defined for the network. In step 108, for each interoperability type, an interoperability support capability is defined for implementation on a node without modification to an application layer of the node.

In step 112, at least the interoperability support capability for the basic type of interoperability is provided on each of the nodes. In step 116, each node is enabled to use the support capability for the basic type of interoperability to obtain, on an ad-hoc basis, a support capability for another type of interoperability with another of the nodes. Where the ad-hoc support of interoperability is implemented for the same defined interoperability type on two nodes, the two nodes are made compatible in supporting capability, and compatible applications on the two nodes can implement interoperability between the two nodes.

One implementation of the method 100 shall now be described. In a net-centric environment, not all nodes need to be equal in their capabilities to use information/services provided from other nodes (or to contribute them to others). Rather, a node can be designed to interoperate at a specific level in a plurality of interoperability levels, e.g., as defined in Table 1.

TABLE 1

Node Levels of Interoperability

| LEVEL OF INTEROPERABILITY | OPERATIONAL CAPABILITY |
|---|---|
| 0 - No generic interoperability | |
| 1 - Minimum level of interoperability | Can receive and transmit data |
| 2 - Interaction | Data exchange and some fusion capability/complex node activity |
| 3 - Contribution | Fusion capability and multi-node tasking giving it area command and control (C2) capability |
| 4 - Coordination | Extension fusion capability/theater-wide operational control |

A node, e.g., a mobile ad-hoc node, having a minimum level of interoperability (e.g., level 1 in Table 1) may be, e.g., a hand-held device. A node having a level 2 of interoperability may be, for example, a mobile surveillance platform. A node having a level 3 of interoperability may be, for example, a ground command and control post, and headquarters may exemplify a node having a level 4 of interoperability.

It should be understood that the levels defined in Table 1 are exemplary only. For a different network, it may be appropriate to define more, fewer and/or different levels of interoperability. Furthermore, although the levels described in Table 1 might be described as hierarchical, it should be understood that in other implementations, types of interoperability may not necessarily be hierarchical.

Referring again to the exemplary network 20 and in the present exemplary implementation, nodes 24 have various interoperability levels as defined in Table 1. Every node 24 is provided with a support capability for the minimum level of interoperability (MLI) (level 1). The minimum level of operability of the network 20 is simple relative to the other interoperability levels. Generally, a support capability for a MLI may be implemented in most information systems. A MLI support capability may include, e.g., (i) a capability to link to an Internet Protocol (IP) network, (ii) a capability to register and discover services (including a mobile ad-hoc environment), and (iii) a capability to receive and transmit data.

The higher interoperability levels shown in Table 1 are defined to describe higher system capabilities in the network 20. The higher levels describe systems in the network 20 which are enabled to offer more complex and efficient capabilities. An appropriate interoperability level of a system is determined by examining its mission capability, since needs for interoperability can vary with the intended mission(s) of a system.

Figure 3:
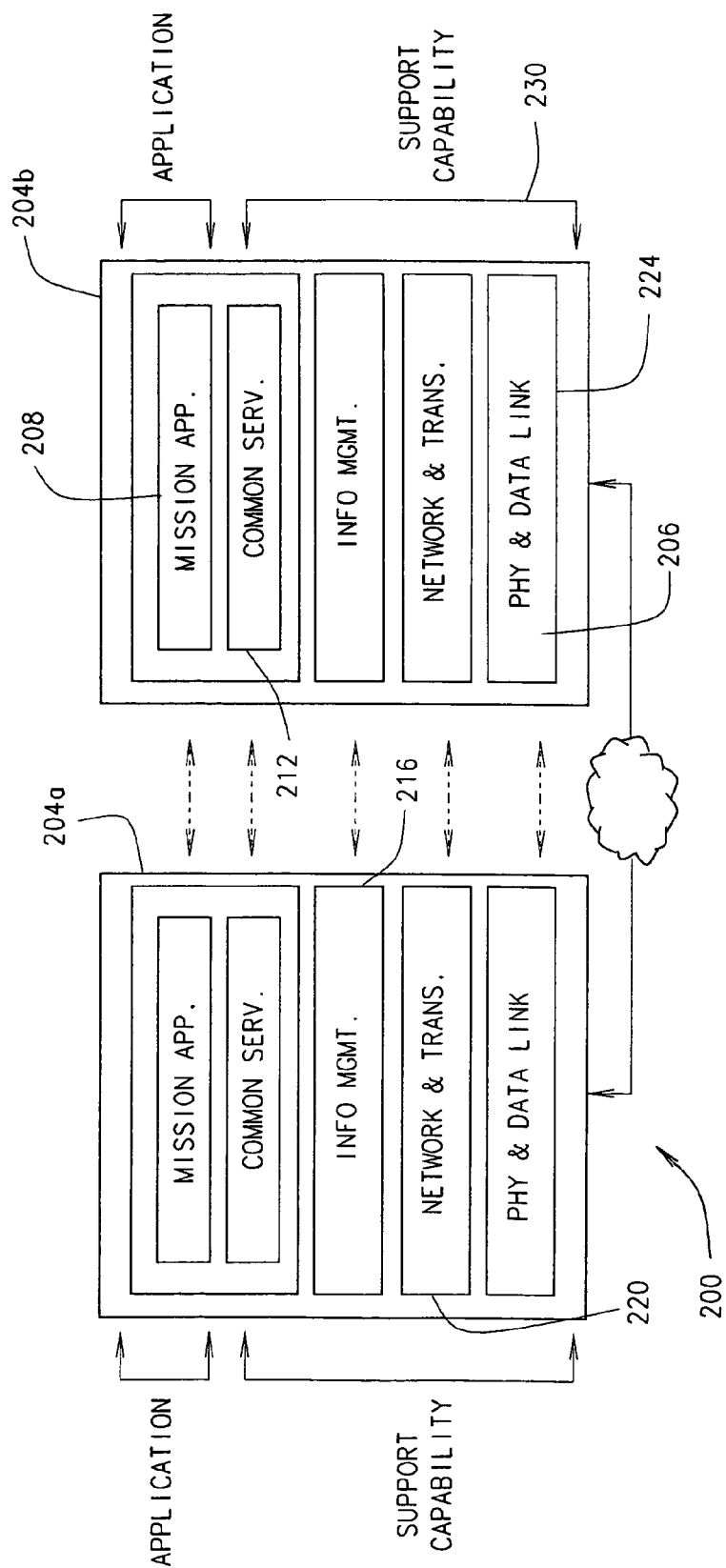
FIG. 3 is a diagram of node architecture in accordance with one implementation of the disclosure.

A network architecture in accordance with one implementation of the disclosure is indicated generally in FIG. 3 by reference number 200. Each network node 204 includes a plurality of architectural layers 206 including a mission application layer 208, a common services layer 212, an information management layer 216, a network and transport layer 220, and a physical and data link layer 224. The foregoing layers are exemplary, and networks and nodes could be described in various architectural terms in other implementations. To achieve interoperability between the two nodes 204a and 204b, compatibility is to be provided at each architectural layer 206 of the nodes. In each of the nodes 204, however, interoperability support capability 230 is separated from the application layer 208, out of a recognition by the inventor that interoperability can be achieved when there is sufficient support for compatible applications to work together. A system's application(s) are typically specifically designed to meet the function(s) of that system. In a net-centric environment, it generally is desirable not to constrain what the function(s) of a system should be. Therefore, it can be desirable not to specify how application(s) should behave, and to leave it for the designer of a system to decide how system function(s) would best fit a net centric environment. Additionally, the inventor has observed that keeping interoperability support separate from the functioning of node applications facilitates the quantification and measurement of interoperability support capabilities of a node. Various implementations of the disclosure thus provide a model for interoperability by physically and/or logically separating support capability from applications.

Interoperability can be achieved between two nodes when one or more application functions on one node are dynamically discovered to be compatible with one or more application functions on the other node. An application on a system can be enabled to determine, through dynamic discovery, whether it is compatible with an application of another system. Implementations for dynamic discovery are available. One such implementation is the Universal Description, Discovery, and Integration (UDDI) standard. The UDDI standard for establishing a registry for dynamic discovery is maintained by the Organization for Advancement of Structured Information Standards (OASIS).

In addition to the provision of dynamic discovery of application compatibility, specific types, e.g., levels, of support capabilities may be defined and may be structured to support and align with the defined types, e.g., levels, of interoperability as previously described. In the exemplary network 20, the lowest level of supporting capability supports the MLI to ensure common interoperability.

Appropriate support capabilities for interoperability may be identified at each interoperability level by defining specific requirements for interoperability support based on key attributes of interoperability, i.e., attributes representing aspects of technology that govern interoperability. Attributes and associated requirements appropriate for the foregoing MLI level are shown in Table 2. For information technology-related implementations, interoperability typically may involve attributes such as those listed in Table 2. It should be noted, however, that attributes could differ in various implementations. Accordingly, it should be understood that Table 2 and the following description of attributes, requirements and metrics are exemplary only.

TABLE 2

| ATTRIBUTES | REQUIREMENTS |
|---|---|
| Services | Use of community registry for service discovery |
| Data/Semantics | Use of community XML Schemas in data exchanged |
| Information Assurance | Adherence to Common Criteria EAL |

TABLE 2-continued

| ATTRIBUTES | REQUIREMENTS |
| --- | --- |
| End-to-end QoS | Support for Service Level Agreements |
| Information Management | WS-I Basic Profile Standard compliant |
| Transport | Link to an IP network |

Requirements for other, e.g., higher, levels of interoperability could, and most likely would, differ from the requirements shown in Table 2. Additionally or alternatively, attributes for other, e.g., higher, levels of interoperability could differ from the attributes shown in Table 2. The foregoing attributes can be structured to characterize interoperability in a net centric environment. Metrics pertinent to the attributes can be used to determine the suitability of an information system regarding interoperability with others in a net-centric environment. Attributes, requirements and metrics may be characterized, e.g., in the following manner.

Data/Semantics (Modeling/Metadata)

To exchange and use information, a system typically must be able to understand the data being exchanged. In some implementations, the above-described interoperability levels are consistent with the Department of Defense (DoD) Net Centric Data Strategy and support a framework of Community of Interest (COI) Services. The COI Services Framework provides guidance and requirements for designing and testing data/semantics. Exemplary metrics for evaluating the Data/Semantics attribute are (i) adherence to applicable community-accepted schemas and (ii) use of self-described data.

Services

Various implementations of the disclosure are consistent with Service Oriented Architecture (SOA) and are also consistent with guidelines set forth by the Net Centric Enterprise Services (NCES) effort. It is contemplated that interoperability levels and associated support capabilities evolve to meet its specifications as they become available. Exemplary metrics for evaluating the Services attribute include how many NCES services applicable to system-based intended missions the system supports and how well—based on scalability, robustness, timeliness, etc., the system supports such services. Other metrics may include characteristics of SOA, e.g., degree of separation of implementation from interfaces, implementation of contract-based interaction, how well a service is described by the provider and found by consumers on the registry, and use of relevant registries. Another metric is, e.g., relevance of a system's services to intended communities of interest (COIs).

Information Assurance

In some implementations, the above-described interoperability levels are consistent with standards in the Joint Technical Architecture (JTA) and the NCES Information Assurance (IA) Service. In addition, processes and procedures in DoD Information Technology Security Certification and Accreditation Process (DITSCAP) may be followed. IA requirements for levels of interoperability may be based on mission security requirements. An exemplary metric for the Information Assurance attribute is adherence to applicable Common Criteria (CC) Evaluation Assurance Levels (EAL) that make the most sense for a system given its intended missions.

Transport

In some implementations, applicable transport standards in the Joint Technical Architecture (JTA) may be used, and requirements for interoperability levels may be consistent with the Global Information Grid (GIG) Key Interface. Exemplary metrics for the Transport attribute include how many applicable transport mechanisms are supported and how well—based on bandwidth, latency, robustness, etc., they are supported.

Information Management

In some implementations, the LISI model developed by the MITRE Corporation is extended and specific specifications for implementation are provided. An example of metrics for the Information Management attribute is adherence to applicable information management levels specified to support a system's intended missions.

End-to-End Quality of Service (QoS)

In some implementations, end-to-end QoS is accounted for by specifying and advertising contracts such as Service Level Agreements (SLA). An example of metrics for the End-to-End QoS attribute is performance of SLAs and their applicability to intended missions.

Figure 4A:
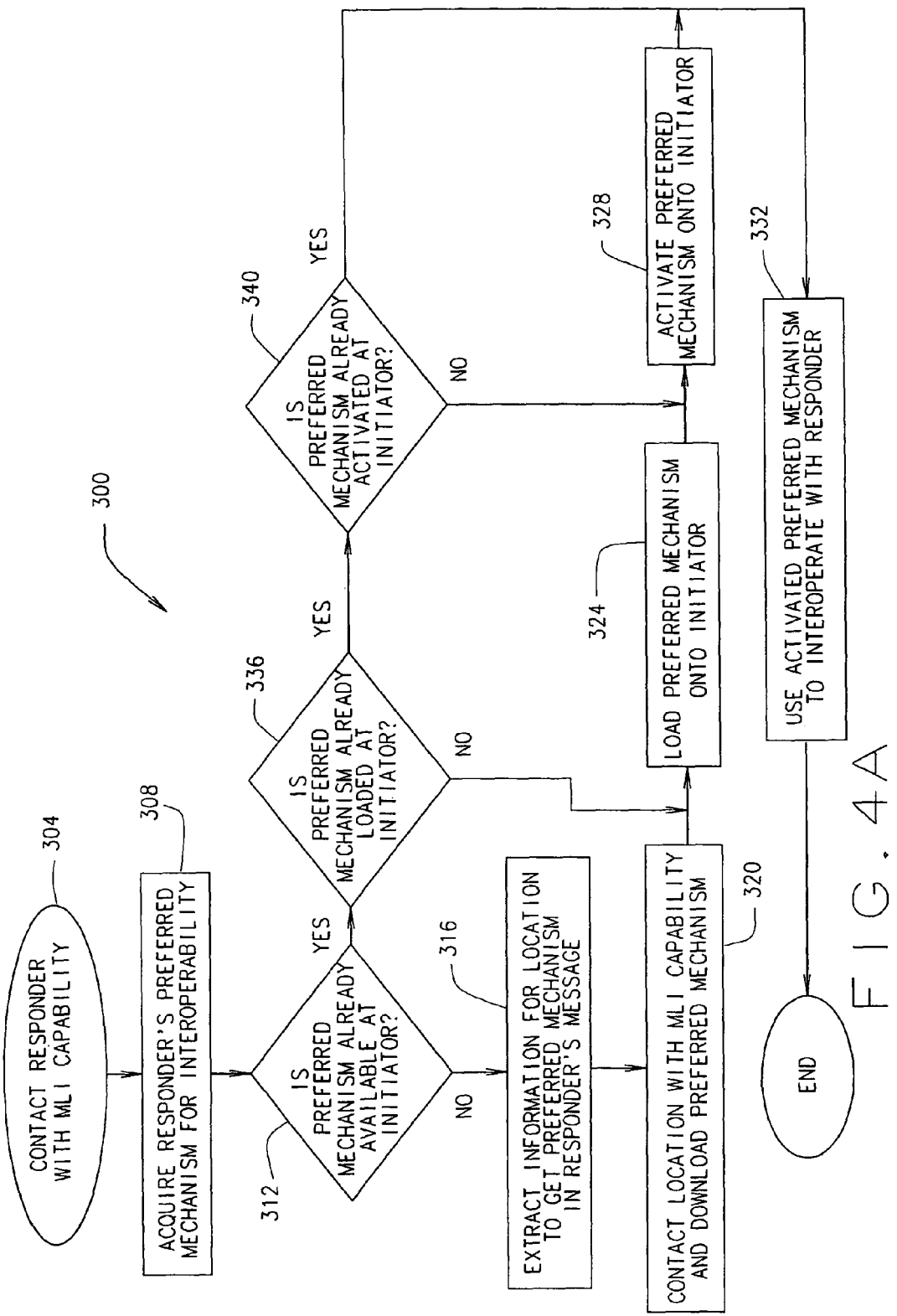
FIGS. 4A and 4B are flow diagrams of a method performed by two nodes to obtain interoperability in accordance with one implementation of the disclosure.
Figure 4B:
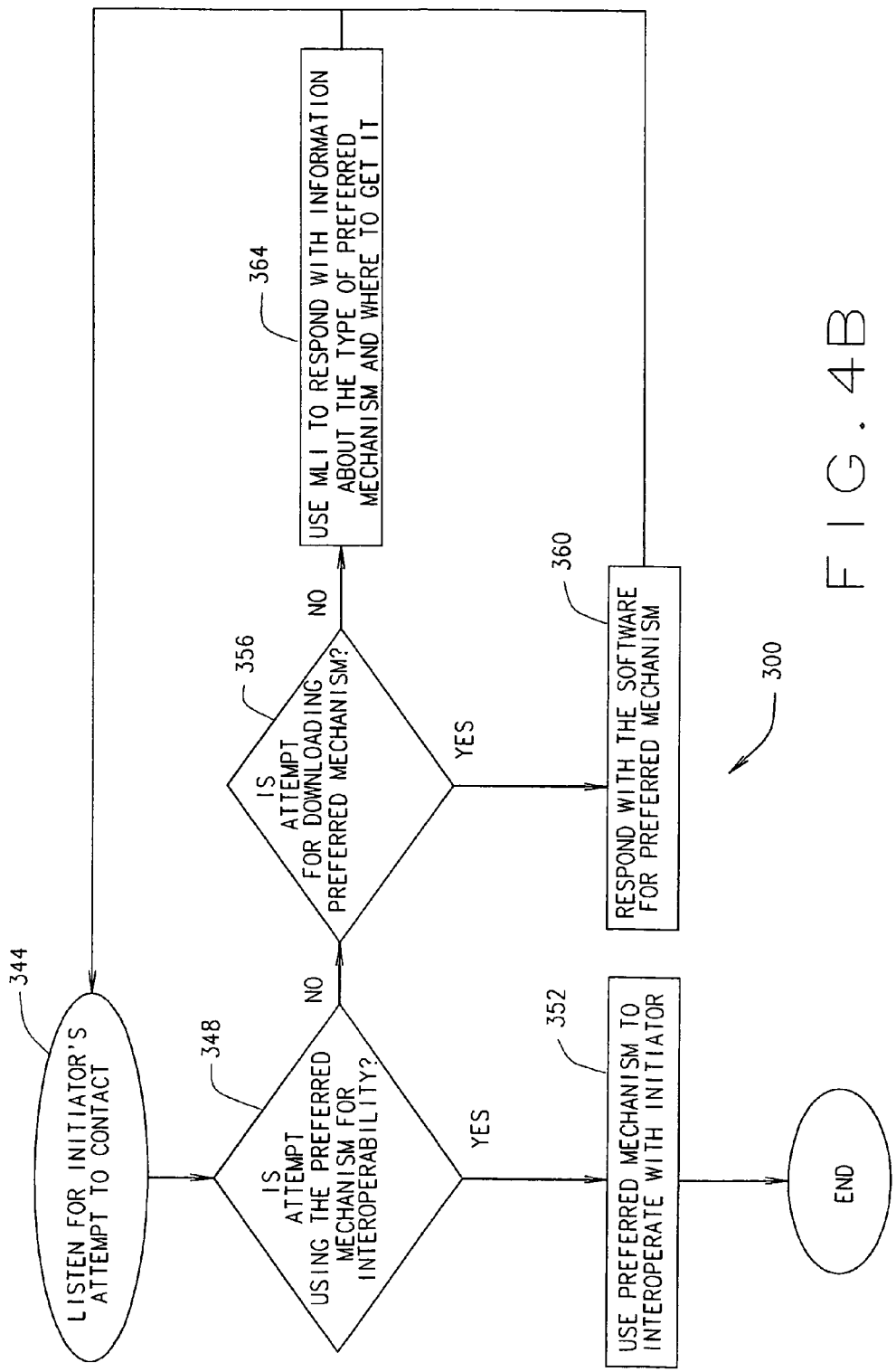

Referring again to the exemplary network 20, each node 24 is configured to use the support capability for the MLI to obtain, on an ad-hoc basis, a support capability for another level of interoperability with another of the nodes 24. For example, if the node 24a attempts to contact the node 24b to establish interoperability with the node 24b, interaction between the two nodes may take place as indicated generally in FIGS. 4A and 4B by reference number 300. In FIGS. 4A and 4B, the nodes 24a and 24b are respectively referred to as "initiator" and "responder" nodes. Actions by the initiator node 24a are shown in FIG. 4A. In step 304, the node 24a uses its support capability for the MLI to contact the responder node 24b. In step 308, the initiator node 24a uses the MLI support capability to get information from the responder node 24b identifying a support capability for an interoperability level preferred by the responder node 24b. The responder node 24b uses its support capability for the MLI to provide this information to the initiator node 24a.

In step 312, the initiator node 24a determines whether the preferred support capability is already available at the initiator node 24a. If not, then in step 316 the initiator node 24a uses its support capability for the MLI to extract information from the responder node 24b identifying a location at which the initiator node 24a may obtain the preferred support capability. The preferred support capability may be available, e.g., from the responder node 24b, and/or it may be available on a common server, which, like the nodes 24a and 24b, is preloaded with the support capability for the MLI. In step 320, the initiator node 24a uses its MLI support capability to contact the appropriate location (e.g., a server or the responder node 24b) and download the preferred support capability onto the initiator node 24a. In step 324, the preferred support capability is loaded onto the initiator node 24a. In step 328, the preferred support capability on the initiator node 24a is activated. In step 332, the initiator node 24a uses the preferred support capability to interoperate with the responder node 24b.

If in step 312 the initiator node 24a determines that the preferred support capability is already available on the initiator node 24a, then in step 336 it determines whether the preferred support capability is already loaded onto the initiator node 24a. If not, then control passes to step 324. If yes, then in step 340 it is determined whether the preferred support capability is already activated on the initiator node 24a. If yes, then in step 332 the node 24a uses the preferred support capability to interoperate with the responder node 24b. If not, then control passes to step 328.

Actions by the responder node 24b are shown in FIG. 4B. In step 344, the responder node 24b listens for an attempt by another node to contact the responder node 24b. In the event of such an attempt (e.g., by the initiator node 24a), then in step 348 the responder node 24b determines whether the attempt is made using the support capability preferred by the responder node 24b. If yes, then in step 352 the responder node 24b uses the preferred support capability to interoperate with the initiator of the contact. If in step 348 the attempt is not made using the preferred support capability, then in step 356 the responder node 24b uses the MLI support capability to determine whether the attempt is for the purpose of downloading the preferred support capability. If yes, then in step 360 the responder node 24b uses the MLI support capability to provide the software for the preferred support capability to the node attempting to obtain it. Control then returns to step 344. If in step 356 the attempt is determined not to be for the purpose of downloading the preferred support capability, then in step 364 the responder node 24b uses the MLI support capability to respond to the initiating node with information identifying the preferred support capability and where to obtain it. Control then returns to step 344.

Implementations of the foregoing methods and systems can be implemented in software, firmware, and/or hardware. The method could be easily integrated into information services and architectures. Whereas implementing compliance with Information Exchange Requirements (IERs) and Key Performance Parameters (KPPs) typically involves a complex process of implementing solutions to thousands of requirements, implementations of the disclosure can reduce the need for multiple one-to-one interoperability testing and certification, e.g., for a military environment. System-of-systems interoperability can be achieved while complexity and risk can be drastically lowered. Various implementations of the disclosure, when used to address long-standing complexities relating, e.g., to military command and control, could revolutionize the effectiveness of military operations. The foregoing methods also address civil and commercial needs for maximizing the effectiveness of resources in responding to new tasks.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method of providing interoperability among a plurality of nodes in a communications network, the method comprising:
    defining a plurality of different types of interoperability which includes a basic type of interoperability;
    for each defined interoperability type, defining a support capability applied to each said node of said plurality of nodes to support the type of interoperability of each said node, the support capability being implemented on a first node to provide, at node architectural layers of the first node below an application layer of the first node, compatibility between the first node and a second node, where the second node has the same type of interoperability as the first node;
    on each of the nodes, providing one or more of the support capabilities, including at least the support capability for the basic type of interoperability; and
    configuring each said node to:
        have interoperability with other ones of said nodes using the basic type of interoperability;
        have a download capability to download a support capability available from any other one of the nodes;
        operate such that only when the first node establishes communication with the second node does the first node determine whether the second node uses another of the interoperability types in addition to the basic type of interoperability, and
        obtain, as necessary and on an ad-hoc basis, and use the download capabilities of each of the first and second nodes and availability information from the second node to initiate a download to the first node of a support capability available from the second node that provides the support capability for the other of the interoperability types for activation on the first node.

2. The method of claim 1, wherein, for a given interoperability type, defining a support capability comprises:
    using attributes of interoperability at the given interoperability type to define requirements for interoperability support; and
    defining the support capability for the given interoperability type in accordance with the requirements.

3. The method of claim 1, wherein defining a plurality of types of interoperability is performed based at least in part on node capabilities for interaction, contribution, and coordination.

4. The method of claim 1, further comprising, when the two nodes have a support capability for the same type of interoperability, allowing compatible applications on the two nodes to implement interoperability between the two nodes.

5. The method of claim 2, wherein the requirements for the basic interoperability type include the following:
    community-registry-based service discovery;
    use of community schemas in data exchanged;
    support for service level agreements;
    compliance with a web services interoperability standard; and
    linking to an IP (Internet Protocol) network.

6. The method of claim 1, wherein the nodes include mobile ad-hoc nodes.

7. A method of providing interoperability among a plurality of nodes in a communications network, the method comprising:
    defining a plurality of types of node interoperability;
    for each said node of said plurality of nodes interoperability type, defining a support capability for implementation on a given one of the nodes to provide, below an application layer of the given node, architectural layer compatibility between the given node and another one of the plurality of nodes on which the interoperability type is supported;
    making a given one of the defined support capabilities available to a first node of the plurality of nodes, on an ad-hoc basis, and only when the first node requires communication with a second one of the nodes, to support the corresponding type of interoperability between the first node and the second node on which the given support capability is provided;
    the making available accomplished by providing the first and second nodes with download capabilities so that the first node is able to detect a need for downloading a given one of the defined support capabilities associated with the node interoperability associated with the second node, and wherein the second node makes the given one of the defined support capabilities available through a download operation to the first node using a basic type of interoperability supported on the first and second nodes, to effect a downloading of the given one of the defined support capabilities from the second node to the first node only when required by the first node; and once the given one of the defined support capabilities is implemented on the first node, allowing compatible applications on the first and second nodes to implement interoperability between the first and second nodes using the type of interoperability corresponding to the given one of the defined support capabilities.

8. The method of claim 7, further comprising providing for discovery of compatibility between an application on the first node and an application on the second node.

9. The method of claim 7, further comprising:

providing the support capability defined for the basic type of interoperability on each said node; and enabling each said node to use the support capability for the basic type to obtain a support capability defined for another interoperability type.

10. The method of claim 7, further comprising:

providing the support capability defined for the basic type of interoperability on each of the nodes; and enabling each said node to use the support capability for the basic type to obtain a support capability available to another node.

11. The method of claim 7, wherein making one of the defined support capabilities available to a first node comprises:

providing, on each said node, one or more of the defined support capabilities, the one or more of the defined capabilities including at least a support capability defined for a basic type of interoperability; and enabling the first node to use the support capability for the basic type to access a support capability being made available.

12. The method of claim 7, wherein the interoperability types are defined based on capabilities of each of the nodes.

13. The method of claim 7, wherein the nodes include mobile ad-hoc nodes.

14. A communications network including a plurality of ad-hoc nodes, the network comprising:

a plurality of defined types of node interoperability, the defined types including a basic type of interoperability and each of the nodes including a download capability;

for each defined interoperability type, a support capability configured for implementation on a node of said plurality of nodes to support the type of interoperability, the support capability implementable to provide compatibility for the type of operability between two given ones of the nodes without modification to applications of the two given nodes;

each of the nodes of the network comprising at least the support capability for the basic type of interoperability;

each said node of the network configured to use the support capability for the basic type of interoperability to:

only when communication is desired by a first one of the nodes with a second one of the nodes, then using the first node to determine whether the second node uses a different type of interoperability in addition to the basic type of interoperability;

only if the first node determines that the second node is using the different type of interoperability, then using a download capability of the first node to download information from the second node that provides the support capability for the different type of inoperability to the first node; and when the downloaded support capability for the different type of interoperability is activated, using the first node to interoperate with the second node using the different type of interoperability.

15. The network of claim 14, wherein the plurality of nodes comprise two nodes on which a support capability for a preferred type of interoperability is activated, and wherein compatible applications of the two nodes implement interoperability between the two nodes.

16. The network of claim 14, wherein the nodes comprise one or more mobile nodes.

17. The network of claim 14, wherein the nodes comprise one or more servers for making one or more of the support capabilities available to the nodes.

18. The network of claim 14, wherein a support capability for a given type of interoperability is defined in accordance with a plurality of requirements based on attributes of interoperability defined for the given type.

19. The network of claim 14, wherein the types of node interoperability are defined as a plurality of levels, the levels comprising a minimum level of interoperability.

* * * * *